(12) United States Patent
Cao

(10) Patent No.: US 10,652,858 B2
(45) Date of Patent: May 12, 2020

(54) USER EQUIPMENT, NETWORK DEVICE, AND DATA TRANSMISSION METHOD

(71) Applicant: HUAWEI TECHNOLOGIES CO., LTD., Shenzhen (CN)

(72) Inventor: Zhenzhen Cao, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/892,422

(22) Filed: Feb. 9, 2018

(65) Prior Publication Data

US 2018/0167912 A1    Jun. 14, 2018

Related U.S. Application Data

(63) Continuation of application No. PCT/CN2015/086799, filed on Aug. 12, 2015.

(51) Int. Cl.
| | | |
|---|---|---|
| *H04W 72/00* | (2009.01) | |
| *H04W 72/02* | (2009.01) | |
| *H04W 72/10* | (2009.01) | |
| *H04W 72/04* | (2009.01) | |
| *H04W 76/14* | (2018.01) | |

(Continued)

(52) U.S. Cl.
CPC ......... *H04W 72/02* (2013.01); *H04W 72/048* (2013.01); *H04W 72/10* (2013.01); *H04W 76/14* (2018.02); *H04W 88/04* (2013.01); *H04W 88/06* (2013.01)

(58) Field of Classification Search
CPC ... H04W 72/02; H04W 72/048; H04W 88/04; H04W 76/14; H04W 88/06
See application file for complete search history.

(56) References Cited

U.S. PATENT DOCUMENTS

| 9,578,651 B2* | 2/2017 | Ryu ................. H04W 72/1247 |
| 9,999,081 B2* | 6/2018 | Jeong .................... H04W 76/14 |
| 2003/0123425 A1 | 7/2003 | Walton et al. |

(Continued)

FOREIGN PATENT DOCUMENTS

| CA | 2920501 A1 | 2/2015 |
| CN | 102547871 A | 7/2012 |

(Continued)

OTHER PUBLICATIONS

R1-144652 Intel Corporation,"On Overlap of Multiple D2D Resource Pools and UE Behavior",3GPP TSG RAN WG1 Meeting #79,San Francisco, USA, Nov. 17-21, 2014,total 6 pages.

(Continued)

*Primary Examiner* — Phuc H Tran

(74) *Attorney, Agent, or Firm* — Kilpatrick Townsend & Stockton LLP

(57) ABSTRACT

The present invention discloses a data transmission method, user equipment, and a network device. A D2D communications system configures a logical channel used by different types of D2D data and configures a resource selection parameter for user equipment. In this way, the user equipment is capable of selecting a communication resource by itself according to the resource selection parameter and D2D data to be transmitted by the user equipment, and allocating the resource to the to-be-transmitted D2D data, improving system reliability.

14 Claims, 4 Drawing Sheets

(51) Int. Cl.
*H04W 88/04* (2009.01)
*H04W 88/06* (2009.01)

(56) References Cited

U.S. PATENT DOCUMENTS

| | | | |
|---|---|---|---|
| 2014/0241261 A1 | 8/2014 | Ratasuk et al. | |
| 2014/0321377 A1 | 10/2014 | Ryu et al. | |
| 2015/0016263 A1 | 1/2015 | Zou et al. | |
| 2015/0016402 A1 | 1/2015 | Wager et al. | |
| 2016/0143078 A1 | 5/2016 | Jeong | |
| 2016/0150391 A1* | 5/2016 | Lee | H04W 56/002 370/329 |
| 2016/0183276 A1* | 6/2016 | Marinier | H04W 72/02 370/329 |
| 2017/0006582 A1* | 1/2017 | Jung | H04W 72/02 |
| 2017/0006649 A1 | 1/2017 | Zhao et al. | |
| 2017/0171837 A1 | 6/2017 | Chen et al. | |
| 2017/0230918 A1* | 8/2017 | Ryu | H04W 52/383 |
| 2017/0230939 A1* | 8/2017 | Rudolf | H04W 72/04 |

FOREIGN PATENT DOCUMENTS

| | | |
|---|---|---|
| CN | 104202740 A | 12/2014 |
| CN | 104378825 A | 2/2015 |
| CN | 104488322 A | 4/2015 |
| CN | 104602179 A | 5/2015 |
| CN | 104754524 A | 7/2015 |
| CN | 104811892 A | 7/2015 |
| EP | 2999289 A1 | 3/2016 |
| EP | 3131321 A1 | 2/2017 |
| JP | 2003530009 A | 10/2003 |
| WO | 2014178657 A1 | 11/2014 |
| WO | 2015016646 A1 | 2/2015 |
| WO | 2015021185 A1 | 2/2015 |
| WO | 2015101218 A1 | 7/2015 |
| WO | 2015115847 A1 | 8/2015 |
| WO | 2015116865 A1 | 8/2015 |

OTHER PUBLICATIONS

3GPP TS 36.300 V13.0.0 (Jun. 2015);3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13),total 254 pages.

3GPP TS 36.321 V12.6.0 (Jun. 2015);3rd Generation Partnership Project;Technical Specification Group Radio Access Network;Evolved Universal Terrestrial Radio Access (E-UTRA);Medium Access Control (MAC) protocol specification (Release 12),total 77 pages.

3GPP TS 36.331 V12.6.0 (Jun. 2015); 3rd Generation Partnership Project;Technical Specification Group Radio Access Network;Evolved Universal Terrestrial Radio Access (E-UTRA);Radio Resource Control (RRC);Protocol specification (Release 12),total 449 pages.

* cited by examiner

USER EQUIPMENT, NETWORK DEVICE, AND DATA TRANSMISSION METHOD

CROSS-REFERENCE TO RELATED APPLICATIONS

This application is a continuation of international application No. PCT/CN2015/086799, filed on Aug. 12, 2015, the disclosure of which is hereby incorporated by reference in its entirety.

TECHNICAL FIELD

This application relates to the field of wireless communications, and in particular, to user equipment, a network device, and a data transmission method.

BACKGROUND

In conventional cellular wireless communications technologies, user equipment communicates with a base station by using an air interface and forwards user data to a destination node on a network by using the base station.

With development of mobile communications technologies, to better meet user requirements and improve efficiency of information exchange between user equipments, a mechanism of direct communication between user equipments, that is, device-to-device (D2D) communication, also referred to as sidelink communication, is introduced in a long term evolution (LTE) system. Different from the conventional cellular wireless communications technologies, data of user equipment does not need to be transmitted by using a base station, and is transmitted directly by using an air interface between user equipments, thereby reducing a network forwarding delay. In a D2D communication mode, a direct communication link between user equipments may be established under control or with assistance of a network device such as a base station. A typical application scenario of D2D communication is a public safety scenario, such as communication between fire fighters. A typical service type is a voice service.

As shown in FIG. 1, a D2D communications system includes a base station 101, user equipment (UE) 1, and UE 2. The base station 101 and the UE 1 may perform cellular wireless communication. In addition, the UE 1 and the UE 2 may perform D2D communication.

Currently, D2D communication supports group communication, that is, one-to-many communication, in which D2D user equipment may send D2D data to several user equipments in a communication group. As shown in FIG. 2, a base station 201 controls or assists UE 1, UE 2, UE 3, and UE 4 in establishment of D2D group communication. For example, a group 202 is a public safety group. The UE 1 may directly transmit data to the UE 2, the UE 3, and the UE 4 without using the base station.

Currently, D2D communication further supports unicast communication, that is, one-to-one communication, in which D2D user equipment directly sends D2D data to another user equipment.

However, because transmission resources are obtained by means of contention between user equipments, there may be a problem in an existing D2D communications system, for example, some data is not transmitted in a sufficiently timely and reliable manner because some user equipments fail to obtain resources by means of contention.

Because of the inherent disadvantage of the D2D communication manner in the existing wireless communications system, a new D2D data transmission method and device are urgently needed in the art, to resolve the problem that may exist in the existing D2D communications system, for example, some data is not transmitted in a sufficiently timely and reliable manner.

SUMMARY

Embodiments of the present invention provide a data transmission method and a device, so as to ensure that some data is transmitted in a timely and reliable manner in D2D communication.

According to a first aspect, a data transmission method is provided, including:

determining, by user equipment, a logical channel used by to-be-transmitted D2D data;

determining, by the user equipment, a resource selection parameter of the to-be-transmitted D2D data; and selecting, by the user equipment according to the resource selection parameter, a D2D communication resource from a configured D2D communication resource for the to-be-transmitted D2D data, and sending, on the selected D2D communication resource, the to-be-transmitted D2D data to another user equipment by using the determined logical channel.

With reference to the first aspect, in the method, the determining, by user equipment, a logical channel used by to-be-transmitted D2D data includes:

determining, according to configuration information and a type of the to-be-transmitted D2D data, the logical channel used by the to-be-transmitted D2D data, where the configuration information includes a correspondence between the logical channel and the type of the to-be-transmitted D2D data.

With reference to the first aspect, in the method, the configuration information is stored in the user equipment; or the configuration information is received by the user equipment from the network device, and the configuration information is determined by the network device according to types of all types of D2D data.

With reference to the first aspect, in the method, before the determining, by user equipment, a logical channel used by to-be-transmitted D2D data, the method includes:

sending, by the user equipment, type information of the to-be-transmitted D2D data to the network device; and receiving, by the user equipment, the configuration information sent by the network device, where the configuration information includes the logical channel configured by the network device for the to-be-transmitted D2D data according to the type information of the to-be-transmitted D2D data; and the determining, by user equipment, a logical channel used by to-be-transmitted D2D data includes:

determining, by the user equipment, the logical channel according to the configuration information sent by the network device.

With reference to the first aspect, in the method, the resource selection parameter specifies a condition in which the to-be-transmitted D2D data can or cannot use a D2D communication resource; or the resource selection parameter specifies a condition in which the to-be-transmitted D2D data can or cannot use a D2D communication resource, and a quantity of resources that can be occupied each time the to-be-transmitted D2D data uses a D2D communication resource.

With reference to the first aspect, in the method, the resource selection parameter includes a resource occupation probability, and the resource occupation probability specifies a probability that a resource block in the D2D communication resource can be occupied when the to-be-transmitted D2D data is sent.

With reference to the first aspect, in the method, the resource selection parameter includes a backoff resource occupation time, and the backoff resource occupation time specifies a minimum interval at which the to-be-transmitted D2D data is transmitted twice by using a D2D communication resource when the to-be-transmitted D2D data is sent.

With reference to the first aspect, in the method, the resource selection parameter is stored in the user equipment; or the resource selection parameter is received by the user equipment from the network device, and the resource selection parameter is determined by the network device according to the type of the to-be-transmitted D2D data.

With reference to the first aspect, in the method, before the determining, by the user equipment, a resource selection parameter of the to-be-transmitted D2D data, the method further includes:

sending, by the user equipment, the type information of the to-be-transmitted D2D data to the network device; and receiving, by the user equipment, the resource selection parameter sent by the network device, where the resource selection parameter is determined by the network device for the to-be-transmitted D2D data according to the type information of the to-be-transmitted D2D data.

With reference to the first aspect, in the method, the type of the to-be-transmitted D2D data includes a priority of the D2D data and/or a service type of the D2D data.

With reference to the first aspect, in the method, the configured D2D communication resource falls within a range of an uplink transmission resource or out of a range of an uplink transmission resource.

According to a second aspect, a data transmission method is provided, including:

configuring, by a network device according to a type of D2D data to be transmitted by user equipment, a resource selection parameter that corresponds to the D2D data, where the resource selection parameter specifies a condition in which the D2D data can or cannot use a D2D communication resource; and sending, by the network device, the configured resource selection parameter to the user equipment.

With reference to the second aspect, in the method, before the sending, by the network device, the resource selection parameter to the user equipment, the method includes:

receiving, by the network device, type information that is of the D2D data to be transmitted by the user equipment and that is sent by the user equipment.

With reference to the second aspect, in the method, before the sending, by the network device, the resource selection parameter, the method further includes:

configuring, by the network device according to a type of D2D data in a D2D system, a logical channel for each type of D2D data; and sending, by the network device, configuration information to the user equipment, where the configuration information includes a correspondence between each type of D2D data and the logical channel; or configuring, by the network device according to a type of D2D data in a D2D system and a type of each user equipment in the D2D system, a logical channel for D2D data of each user equipment in the D2D system; and sending, by the network device, configuration information to the user equipment, where the configuration information includes a correspondence between each type of D2D data of the user equipment and the logical channel.

With reference to the second aspect, in the method, before the sending, by the network device, configuration information to the user equipment, the method includes:

receiving, by the network device, type information that is of the D2D data to be transmitted by the user equipment and that is sent by the user equipment; and generating, by the network device, the configuration information for the user equipment according to the received type of the D2D data to be transmitted by the user equipment, or generating, by the network device, the configuration information for the user equipment according to the received type of the D2D data to be transmitted by the user equipment and a type of each user equipment in a D2D system.

With reference to the second aspect, in the method, the resource selection parameter specifies a condition in which the to-be-transmitted D2D data can or cannot use a D2D communication resource; or the resource selection parameter specifies a condition in which the to-be-transmitted D2D data can or cannot use a D2D communication resource, and a quantity of resources that can be occupied each time the to-be-transmitted D2D data uses a D2D communication resource.

With reference to the second aspect, in the method, the resource selection parameter includes a resource occupation probability, and the resource occupation probability specifies a probability that a resource block in the D2D communication resource can be occupied when the to-be-transmitted D2D data is sent.

With reference to the second aspect, in the method, the resource selection parameter includes a backoff resource occupation time, and the backoff resource occupation time specifies a minimum interval at which the to-be-transmitted D2D data is transmitted twice by using a D2D communication resource when the to-be-transmitted D2D data is sent.

With reference to the second aspect, in the method, the type of the to-be-transmitted D2D data includes a priority of the D2D data and/or a service type of the D2D data.

With reference to the second aspect, in the method, the D2D communication resource that can be used by the user equipment falls within a range of an uplink transmission resource or out of a range of an uplink transmission resource.

With reference to the second aspect, in the method, the configuring, by a network device according to a type of D2D data to be transmitted by user equipment, a resource selection parameter that corresponds to the D2D data includes:

generating, by the network device, at least one resource selection parameter, where the at least one resource selection parameter includes a resource selection parameter configured for each type of D2D data in the D2D system; and selecting, by the network device according to the type of the to-be-transmitted D2D data, the resource selection parameter that corresponds to the D2D data from the at least one resource selection parameter; or generating, by the network device, a resource selection parameter for all types of D2D data in the D2D system, where the resource selection parameter specifies a condition in which each type of D2D data can or cannot use a D2D communication resource.

According to a third aspect, user equipment is provided, including: a storage unit, a processing unit, a sending unit, and a receiving unit, where the storage unit is adapted to temporarily store to-be-transmitted D2D data;

the processing unit is adapted to: determine a logical channel used by the to-be-transmitted D2D data and a resource selection parameter of the to-be-transmitted D2D data, and select, according to the resource selection parameter, a D2D communication resource from a configured D2D communication resource;

the sending unit is adapted to send, on the D2D communication resource selected by the processing unit, the to-be-transmitted D2D data to another user equipment by using the determined logical channel; and the receiving unit is adapted to receive D2D data sent by another user equipment.

With reference to the third aspect, in the user equipment, the processing unit is adapted to determine, according to configuration information and a type of the to-be-transmitted D2D data, the logical channel used by the to-be-transmitted D2D data, where the configuration information includes a correspondence between the logical channel and the type of the to-be-transmitted D2D data.

With reference to the third aspect, in the user equipment, the configuration information is stored in the user equipment; or the configuration information is received by the receiving unit from the network device, and the configuration information is determined by the network device according to types of all types of D2D data.

With reference to the third aspect, in the user equipment, before the processing unit determines the logical channel used by the to-be-transmitted D2D data, the sending unit is further adapted to send type information of the to-be-transmitted D2D data to the network device;

the receiving unit is further adapted to receive the configuration information sent by the network device, where the configuration information includes the logical channel configured by the network device for the to-be-transmitted D2D data according to the type information of the to-be-transmitted D2D data; and that the processing unit is adapted to determine a logical channel used by the to-be-transmitted D2D data includes: determining the logical channel according to the configuration information sent by the network device.

With reference to the third aspect, in the user equipment, the resource selection parameter specifies a condition in which the to-be-transmitted D2D data can or cannot use a D2D communication resource; or the resource selection parameter specifies a condition in which the to-be-transmitted D2D data can or cannot use a D2D communication resource, and a quantity of resources that can be occupied each time the to-be-transmitted D2D data uses a D2D communication resource.

With reference to the third aspect, in the user equipment, the resource selection parameter includes a resource occupation probability, and the resource occupation probability specifies a probability that a resource block in the D2D communication resource can be occupied when the to-be-transmitted D2D data is sent.

With reference to the third aspect, in the user equipment, the resource selection parameter includes a backoff resource occupation time, and the backoff resource occupation time specifies a minimum interval at which the to-be-transmitted D2D data is transmitted twice by using a D2D communication resource when the to-be-transmitted D2D data is sent.

With reference to the third aspect, in the user equipment, the resource selection parameter is stored in the user equipment; or the resource selection parameter is received by the receiving unit from the network device, and the resource selection parameter is determined by the network device according to the type of the to-be-transmitted D2D data.

With reference to the third aspect, in the user equipment, before the processing unit determines the resource selection parameter of the to-be-transmitted D2D data, the sending unit is further adapted to send the type information of the to-be-transmitted D2D data to the network device; and the receiving unit is further adapted to receive the resource selection parameter sent by the network device, where the resource selection parameter is determined by the network device for the to-be-transmitted D2D data according to the type information of the to-be-transmitted D2D data.

With reference to the third aspect, in the user equipment, the type of the to-be-transmitted D2D data includes a priority of the D2D data and/or a service type of the D2D data.

With reference to the third aspect, in the user equipment, the configured D2D communication resource falls within a range of an uplink transmission resource or out of a range of an uplink transmission resource.

According to a fourth aspect, a network device is provided, including:

a processing unit, adapted to configure, according to a type of D2D data to be transmitted by user equipment, a resource selection parameter that corresponds to the D2D data, where the resource selection parameter specifies a condition in which different types of D2D data can or cannot use a D2D communication resource; and a sending unit, adapted to send the resource selection parameter configured by the processing unit to the user equipment.

With reference to the fourth aspect, in the network device, the network device further includes a receiving unit, adapted to: before the sending unit sends the resource selection parameter to the user equipment, receive type information that is of the D2D data to be transmitted by the user equipment and that is sent by the user equipment.

With reference to the fourth aspect, in the network device, before the sending unit sends the resource selection parameter, the processing unit is further adapted to: configure, according to a type of D2D data in a D2D system, a logical channel for each type of D2D data, and generate configuration information, where the configuration information includes a correspondence between each type of D2D data and the logical channel; and correspondingly, the sending unit is further adapted to send the configuration information generated by the processing unit to the user equipment; or before the sending unit sends the resource selection parameter, the processing unit is further adapted to: configure, according to a type of D2D data in a D2D system and a type of each user equipment in the D2D system, a logical channel for D2D data of each user equipment in the D2D system, and generate configuration information, where the configuration information includes a correspondence between each type of D2D data of the user equipment and the logical channel; and correspondingly, the sending unit is further adapted to send the configuration information generated by the processing unit to the user equipment.

With reference to the fourth aspect, in the network device, the network device further includes a receiving unit, adapted to: before the sending unit sends the configuration information to the user equipment, receive type information that is of the D2D data to be transmitted by the user equipment and that is sent by the user equipment; and the processing unit generates the configuration information for the user equipment according to the received type of the D2D data to be transmitted by the user equipment, or the processing unit generates the configuration information for the user equipment according to the received type of the D2D data to be transmitted by the user equipment and a type of each user equipment in a D2D system.

With reference to the fourth aspect, in the network device, the resource selection parameter specifies a condition in which the to-be-transmitted D2D data can or cannot use a D2D communication resource; or the resource selection parameter specifies a condition in which the to-be-transmitted D2D data can or cannot use a D2D communication resource, and a quantity of resources that can be occupied each time the to-be-transmitted D2D data uses a D2D communication resource.

With reference to the fourth aspect, in the network device, the resource selection parameter includes a resource occupation probability, and the resource occupation probability specifies a probability that a resource block in the D2D communication resource can be occupied when the to-be-transmitted D2D data is sent.

With reference to the fourth aspect, in the network device, the resource selection parameter includes a backoff resource occupation time, and the backoff resource occupation time specifies a minimum interval at which the to-be-transmitted D2D data is transmitted twice by using a D2D communication resource when the to-be-transmitted D2D data is sent.

With reference to the fourth aspect, in the network device, the type of the to-be-transmitted D2D data includes a priority of the D2D data and/or a service type of the D2D data.

With reference to the fourth aspect, in the network device, the D2D communication resource that can be used by the user equipment falls within a range of an uplink transmission resource or out of a range of an uplink transmission resource.

With reference to the fourth aspect, in the network device, the configuring, by the processing unit according to a type of D2D data to be transmitted by user equipment, a resource selection parameter that corresponds to the D2D data includes:

generating, by the processing unit, at least one resource selection parameter, where the at least one resource selection parameter includes a resource selection parameter configured for each type of D2D data in the D2D system; and selecting, by the processing unit according to the type of the to-be-transmitted D2D data, the resource selection parameter that corresponds to the D2D data from the at least one resource selection parameter; or generating, by the processing unit, a resource selection parameter for all types of D2D data in the D2D system, where the resource selection parameter specifies a condition in which each type of D2D data can or cannot use a D2D communication resource.

According to the D2D data transmission method and the devices in the embodiments of the present invention, the D2D communications system configures a logical channel used by different types of D2D data and configures a resource selection parameter for the user equipment. In this way, the user equipment is capable of selecting a communication resource by itself according to the resource selection parameter and D2D data to be transmitted by the user equipment, and allocating the resource to the to-be-transmitted D2D data, improving system reliability.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Although an LTE system is used as an example for description in the background, a person skilled in the art should know that the present invention is applicable not only to the LTE system, but also to another wireless communications system, such as a GSM system, a UMTS system, a CDMA system, or a new network system. Specific embodiments are described below by using the LTE system as an example.

In D2D communication, emergency degrees of different D2D data sent by different user equipments may be different. For example, in a public safety scenario, if an emergency occurs currently, a user may need to inform another user of the emergency by using voice. Therefore, a priority of voice data may be higher than that of common file data. In addition, importance degrees of different user equipments may be different. For example, in a D2D group, a success rate and timeliness of sending D2D data by user equipment used by a group leader should be higher than that of another user equipment.

In the prior art, priorities of data are not classified in D2D communication. When D2D data with different priorities is on a same logical channel, user equipment cannot preferentially send D2D data with a higher priority. As a result, quality of service (QoS) of the data with a higher priority cannot be ensured.

Based on the above analysis, the embodiments of the present invention provide technical solutions that can ensure that data with a higher priority is preferentially sent. The following describes the technical solutions of the present invention in detail.

Network elements used in the present invention include:

user equipment, adapted to: send uplink data and D2D data, receive downlink data sent by a base station, and receive D2D data sent by another UE; and a network device, adapted to: schedule uplink data transmission and D2D transmission for the user equipment, receive and process the uplink data sent by the user equipment, and schedule and send downlink data of the user equipment.

A person skilled in the art should know that the user equipment described in the present invention may be a device such as a user terminal, a terminal device, or a mobile station. In addition, the user equipment may be relay user equipment (UE). The network device described in the present invention may be a base station or a core network device.

Embodiment 1

A conception of this embodiment is that a D2D communications system configures a corresponding resource selection parameter for user equipment according to different types of D2D data, and the user equipment selects, by itself, a communication resource according to the resource selection parameter to perform D2D communication.

Figure 1:
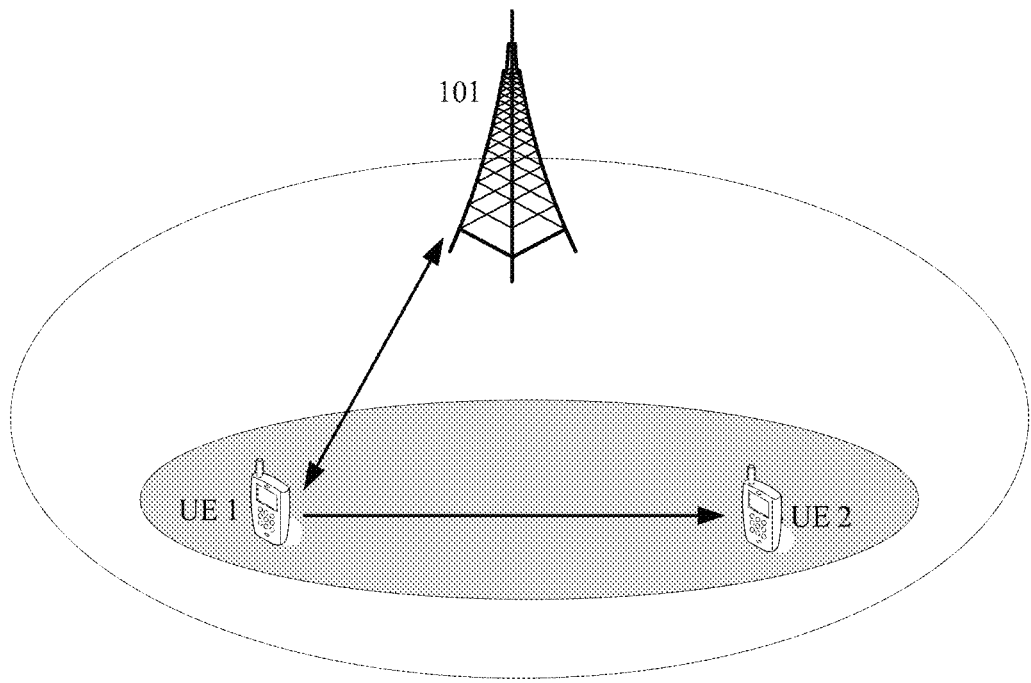
FIG. 1 is a schematic diagram of a D2D transmission system in the prior art according to the present invention.
Figure 2:
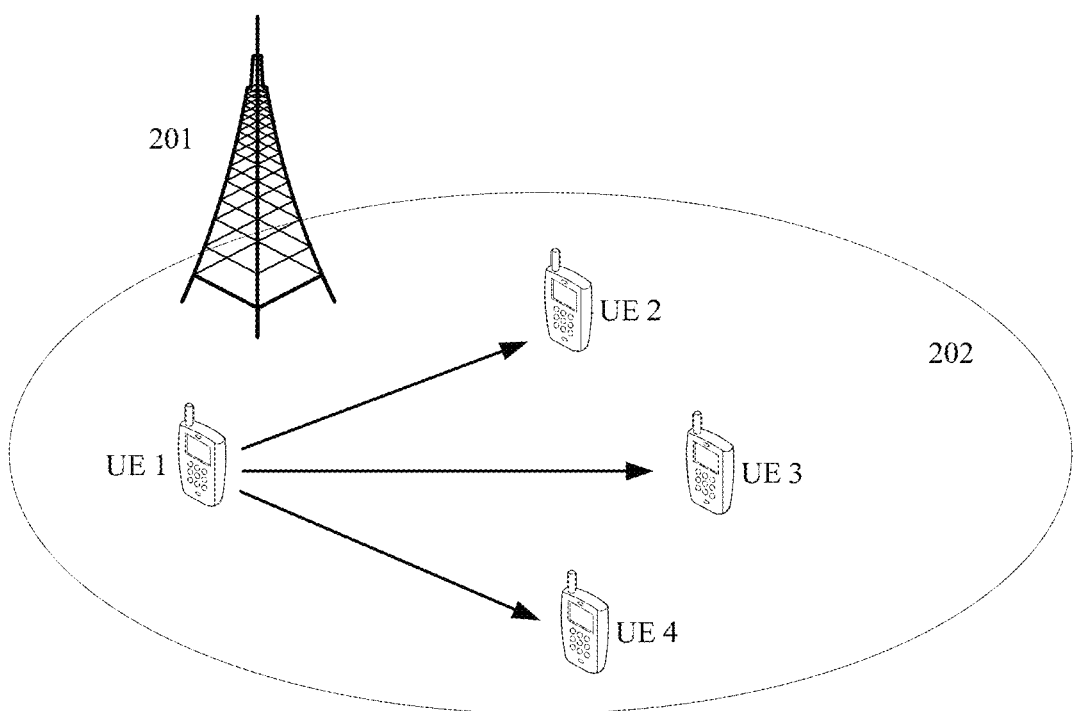
FIG. 2 is a schematic diagram of performing one-to-many D2D transmission in the prior art according to the present invention.
Figure 3:
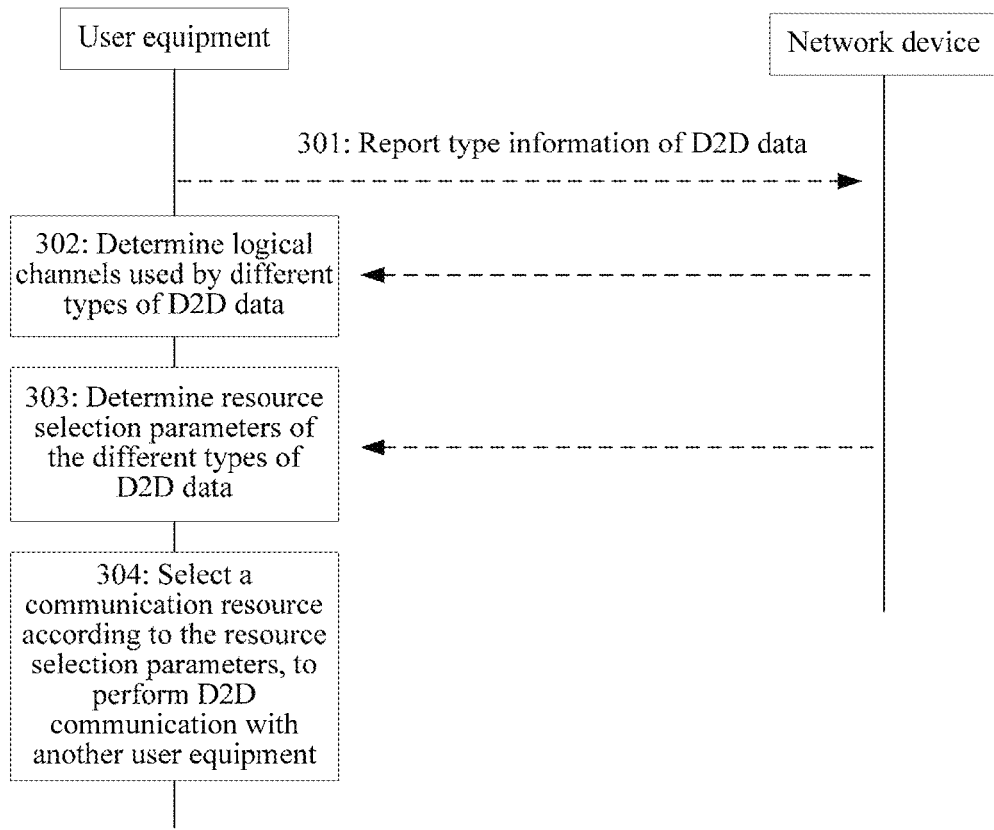
FIG. 3 is a schematic flowchart of a D2D communication resource allocation method according to an embodiment of the present invention.

The following describes a technical solution in Embodiment 1 of the present invention with reference to FIG. 3.

The technical solution in this embodiment includes the following steps:

Step 301: User equipment reports, to a network device, type information of D2D data to be transmitted by the user equipment.

Step 302: The user equipment determines a corresponding logical channel used by the to-be-transmitted D2D data.

Step 303: The user equipment determines a resource selection parameter of different types of D2D data.

Step 304: The user equipment selects a communication resource according to the resource selection parameter and the D2D data that needs to be transmitted by the user equipment, to perform D2D communication with another user equipment.

The type information of the D2D data includes a service type and/or a priority type, or the like.

For the service type, there are usually the following service types in the D2D communications system: a voice service, a data file service, a short message service, and the like. The voice service is usually relatively urgent, and therefore, a priority of data of the voice service is the highest. The data file service is usually less urgent than the voice service, and therefore, a priority of the data file service is intermediate. The short message service does not have a high requirement on real-time quality, and therefore, a priority of data of the short message service is the lowest.

For the priority type, a quantity of different priorities of D2D data are pre-defined in the system. A specific quantity of priorities may be adjusted and changed according to different services carried in the system or different user equipment types. The priority type may be classified into a priority 1, a priority 2, . . . , and a priority N. N is an integer greater than 1. A smaller priority numerical value may indicate a higher priority of the data. Certainly, a greater priority numerical value may alternatively indicate a higher priority. A specific setting of the quantity of priorities may be N=16. A person skilled in the art should know that the quantity of priorities may alternatively be set to another quantity according to a specific application scenario, and details are not described herein.

Priorities of D2D data may be different according to different user equipments. In a specific example, if the quantity of priorities is N=16 and a smaller priority numerical value indicates a higher priority of information, a priority of data sent by important user equipment may be a priority 1, a priority of data sent by common user equipment may be a priority 4, and a priority of data sent by unimportant user equipment may be a priority 8.

Alternatively, priorities of data may be determined according to both different user equipments and different service types of data. Higher importance of a terminal indicates a more urgent service type of data to be transmitted by the terminal, and the data to be transmitted by the terminal has a higher priority; and vice versa. For example, a priority of data that is of a voice service and that is sent by common user equipment is 3, and a priority of data that is of a data file service and that is sent by important user equipment is 7. This is because the voice service of the common user equipment is more urgent. Therefore, the priority of the data is higher than the priority of data that is of the non-urgent service and that is sent by the important user equipment.

The priority settings of the data of all the foregoing different types of services and the priority settings of the data of all the different user equipments may be jointly specified in advance by the user equipment and the network device and stored in the user equipment and the network device.

Logical channels that may be used for transmitting all the foregoing different types of D2D data and priorities of the logical channels may be jointly specified in advance by the user equipment and the network device and stored in the user equipment and the network device.

In step 301, user equipment reports, to a network device, type information of D2D data to be transmitted by the user equipment. In step 301, the user equipment may report, to the network device, only type information of data of each data service that is already buffered in a sending buffer and to be transmitted by the user equipment.

In addition, step 301 may be omitted during actual application, that is, the user equipment may not report, to the network device, the type information of the D2D data to be transmitted by the user equipment, or the network device has not received the type information reported by the user equipment due to a transmission error. In this case, because all types of D2D data are already defined in the system, the network device may learn about all possible types of D2D data to be transmitted by user equipment, so that the network device may allocate logical channels to all types of D2D data.

In addition, step 301 may be performed before step 302 during actual application, or may be performed before step 303, so that the user equipment obtains, before performing step 302 or step 303, the type information of the data to be transmitted by the user equipment.

In step 302, the user equipment may determine a logical channel only for the to-be-transmitted D2D data, or determine a logical channel that corresponds to all types of D2D data that are supported by the user equipment.

The user equipment may allocate the different types of D2D data to a same logical channel or different logical channels according to a system resource condition and a specific application environment.

When the type of the D2D data is the service type, for example, the user equipment may respectively allocate a voice service, a data file service, and a short message service to one logical channel. D2D data of the voice service is allocated to a logical channel group 1, D2D data of the data file service is allocated to a logical channel group 2, and D2D data of the short message service is allocated to a logical channel group 3. Alternatively, the user equipment may allocate the voice service to one logical channel, and allocate the data file service and the short message service to one logical channel. Certainly, another logical channel allocation manner may be used. Alternatively, a logical channel may be allocated to a service type in a fixed manner, and details are not described herein.

When the type of the D2D data is the priority type, for example, the quantity of priorities may be set to 16. If all user equipments perform step 301, assuming that the network device receives only a total of eight types of priorities of data sent by the multiple user equipments, eight logical channels may be allocated, and one logical channel is allocated to each to-be-transmitted data with a different priority. If none of the user equipments performs step 301 or some of the user equipments do not perform step 301, the network device may determine that there are a total of 16 priorities of D2D data that may be sent by all the user equipments. Therefore, the network device may configure 16 logical channels, and one logical channel is allocated to D2D data with each possible priority. A specific correspondence between a logical channel and a priority may be: D2D data with a priority 1 uses a logical channel 1, D2D data with a priority 2 uses a logical channel 2, . . . , and D2D data with a priority N uses a logical channel N. A person skilled in the art should know that another quantity of logical channels and another correspondence between a priority and a logical channel may be set according to a specific application scenario. Alternatively, a priority and a logical channel may be allocated in a fixed manner, and details are not described herein.

A logical channel may be allocated according to a correspondence between the type of the to-be-transmitted D2D data and a logical channel, or may be allocated according to correspondences between all types of D2D data and logical channels. The allocation manner may be specifically set in the configuration information and the configuration information is stored in the user equipment.

In the foregoing example, the configuration information is fixed in the user equipment. In an example in this paragraph, the configuration information is sent by the network device to the user equipment. The network device may send the configuration information by using a system broadcast message and/or dedicated signaling according to a system resource condition and a specific application environment, to inform the user equipment of logical channels used by different types of D2D data. After the user equipment receives the configuration information sent by the network device, the user equipment may determine, with reference to the configuration information and a condition of the user equipment, the logical channels used by the different types of D2D data.

In addition, when the user equipment performs step 301, the network device may learn about service types of D2D data of all user equipments performing step 301. In this way, the network device sends the configuration information to the user equipments according to the types of the D2D data that are reported by the user equipments, and allocates logical channels to the types of the D2D data that are reported by the user equipments. In this case, the configuration information may include identifiers of the allocated logical channels such as numbers of the logical channels. When the configuration information is sent by the network device to the user equipment, the network device may further determine the configuration information according to a type of the user equipment. For example, user equipments may be classified into advanced users, common users, and low-level users, and different logical channels are allocated to the different types of user equipments. In addition, the network device may further allocate logical channels with reference to both types of users and types of D2D data.

In step 303, the user equipment may determine a resource selection parameter only for the to-be-transmitted D2D data, or determine a resource selection parameter that corresponds to all types of D2D data that are supported by the user equipment.

The resource selection parameter specifies a condition in which different types of D2D data can or cannot use a D2D communication resource. The user equipment may determine by itself, according to the resource selection parameter and the type information of the data to be transmitted by the user equipment, whether the user equipment can occupy a D2D communication resource to send the current data.

As described above, the different types of the D2D data include different service types and/or different priority types. In step 302, the user equipment already establishes a correspondence between a service type and/or a priority of the to-be-transmitted data and a logical channel. Therefore, in step 303, that the user equipment determines a resource selection parameter of different types of D2D data is equivalent to that the user equipment determines a resource selection parameter of different logical channels.

A specific form of the resource selection parameter is a resource backoff parameter. The resource backoff parameter includes a resource occupation probability and/or a backoff resource occupation time.

The resource occupation probability specifies a probability that a resource block in a D2D communication resource in the system can be occupied when each different type of D2D data is sent. A larger value of the resource occupation probability indicates a greater probability of occupying a D2D communication resource when this type of D2D data is sent, that is, a greater probability that D2D data with this priority is sent. That the different types of D2D data are priority types is used as an example for description below. For example, a logical channel 1 is configured for D2D data with a priority 1, and a resource occupation probability A of the data is set to be the highest. For example, A may be 1. A logical channel 8 is configured for D2D data with a priority 8, and a resource occupation probability B of the data is set to be intermediate. For example, B may be 0.5. A logical channel 16 is configured for D2D data with a priority 16, and a resource occupation probability C of the data is set to be the lowest. For example, C may be 0.1. A, B, and C are real numbers greater than 0 and less than or equal to 1, A is greater than B, and B is greater than C. When the different types of D2D data are service types, similar to the foregoing example, different resource occupation probabilities are configured for the D2D data of different service types, and details are not described herein.

The backoff resource occupation time specifies a minimum interval at which D2D data of a same type is transmitted twice by using a D2D communication resource when different types of D2D data is sent. A larger value of the backoff resource occupation time indicates a longer time taken to wait for occupying the D2D communication resource when this type of D2D data is sent, that is, a longer time taken by this type of D2D data to wait for sending. That the different types of D2D data are priority types is used as an example for description below. For example, a logical channel 1 is configured for D2D data with a priority 1, and a backoff resource occupation time D of the data is set to be the shortest. For example, D may be 0. A logical channel 8 is configured for D2D data with a priority 8, and a backoff resource occupation time E of the data is set to be intermediate. For example, E may be 15 milliseconds. A logical channel 16 is configured for D2D data with a priority 16, and a backoff resource occupation time F of the data is set to be the longest. For example, F may be 50 milliseconds. D, E, and F are integers greater than or equal to 0, D is less than E, and E is less than F. When the different types of D2D data are service types, similar to the foregoing example, different resource occupation times are configured for the D2D data of different service types, and details are not described herein.

In step 303, if D2D communication resources can be used, the resource selection parameter may further include a quantity of D2D communication resources that can be occupied when the different types of D2D data are sent. That the different types of D2D data are priority types is used as an example for description below. The network device may configure that D2D data with a higher priority may occupy a larger quantity of resources each time and that D2D data with a lower priority may occupy a smaller quantity of resources each time. For example, when sending data with a high priority, the user equipment may select 10 physical resource blocks (PRB) at most each time, and when sending data with a low priority, the user equipment may select two physical resource blocks at most each time. When the different types of D2D data are service types, similar to the foregoing example, different quantities of resources that are occupied are configured for the D2D data of different service types, and details are not described herein.

The resource selection parameter may be pre-configured in the system and stored or fixed in the user equipment, so that the user equipment may determine by itself, after determining the logical channel used by the D2D data, the resource selection parameter of this type of D2D data. Alternatively, the resource selection parameter may be generated by the network device and sent to the user equipment. The network device may generate the resource selection parameter according to a system resource condition and a specific application environment, and send the resource selection parameter to the user equipment by using a system broadcast message and/or dedicated signaling. The network device may generate at least one resource selection parameter. The at least one resource selection parameter includes a resource selection parameter configured for each type of D2D data in the D2D system. The network device selects, according to the type of the to-be-transmitted D2D data, the resource selection parameter that corresponds to the D2D data from the at least one resource selection parameter. Alternatively, the network device may generate a resource selection parameter for all types of D2D data in the D2D system. The resource selection parameter specifies a condition in which each type of D2D data can or cannot use a D2D communication resource.

After receiving the resource selection parameter sent by the network device, the user equipment may determine a final resource selection parameter of different types of D2D data with reference to the resource selection parameter and a condition of the user equipment itself. In addition, when the user equipment performs step 301, the network device may learn about service types or priority types of D2D data of all user equipments performing step 301. In this way, the network device allocates, according to the service types or the priority types reported by the user equipments, resource selection parameters to the D2D data of the service types or the priority types reported by the user equipments. The network device may inform the user equipments of the resource selection parameters used by the D2D data of the different service types or the different priority types by sending a message by using a system broadcast message and/or dedicated signaling. When the resource selection parameter is sent by the network device to the user equipment, the network device may further determine the configuration information according to a type of the user equipment. For example, user equipments may be classified into advanced users, common users, low-level users, and the like, and different resource selection parameters are allocated to the different types of user equipments.

In step 304, in this embodiment, the user equipment determines by itself, according to the resource selection parameter determined in step 303 and in consideration of the type of the D2D data to be transmitted by the user equipment, whether the user equipment can use a D2D communication resource or when the user equipment can use a D2D communication resource. When the user equipment can use a D2D communication resource, the user equipment selects and uses a D2D communication resource, to perform D2D communication with another user equipment by using the logical channel determined in step 302.

Specifically, in step 303, when the resource selection parameter includes a resource occupation probability, before the user equipment selects a D2D communication resource by itself, a random number R is generated for a resource block of each D2D communication resource, and a value of the random number R is a real number greater than 0 and less than 1. If the user equipment is to send D2D data with a priority 1 or a logical channel 1, the user equipment determines values of a random number R and a backoff resource occupation probability value A that is corresponding to the data. If A is greater than R, the user equipment may select, by itself, a D2D communication resource in the resource block to perform D2D communication. If A is not greater than R, the user equipment does not select a D2D communication resource until a random number R' is generated for a next D2D communication resource block. If the user equipment is to send D2D data with another priority, a determining step is similar, and the user equipment respectively determines values of R and resource occupation probability values B and C. Details are not described herein.

When the resource selection parameter includes a backoff resource occupation time, before the user equipment selects a D2D communication resource by itself, the user equipment directly waits, according to the type of the D2D data to be transmitted by the user equipment, for a backoff resource occupation time that corresponds to this type of D2D data, and then occupies the D2D communication resource to perform D2D communication. If the user equipment is to send D2D data with a priority 1, the user equipment waits for D milliseconds. A waiting step is similar for D2D data with an intermediate priority or a low priority, and details are not described herein.

Before step 304, the network device may configure, by using a system broadcast message and/or dedicated signaling, resource configuration information for performing D2D communication by the user equipment.

The resource configuration information may be configured in two manners: a shared mode and a dedicated mode.

Figure 4:
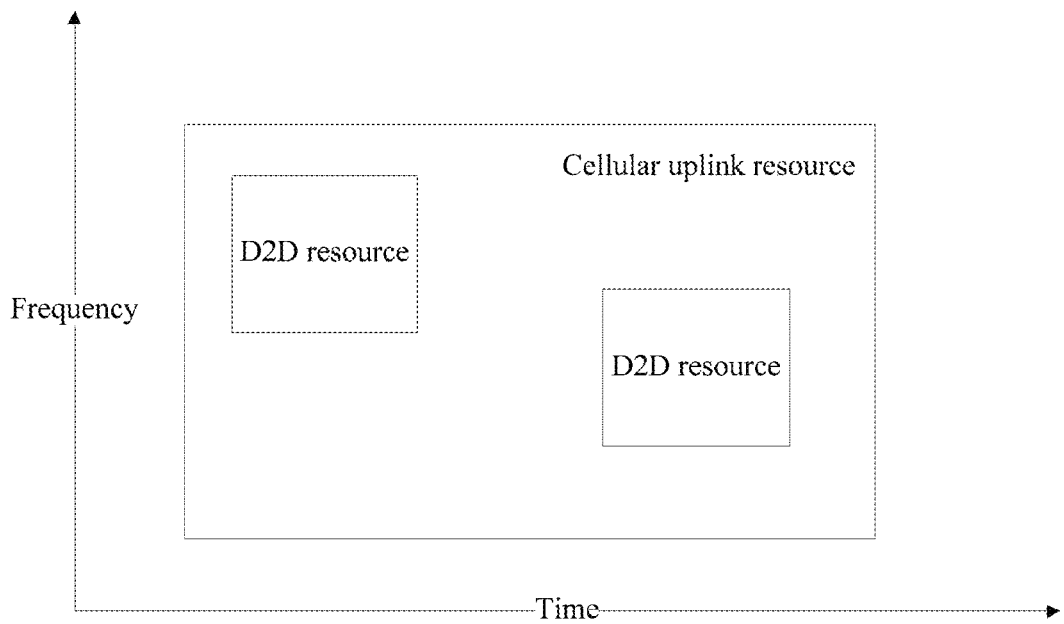
FIG. 4 is a schematic diagram of a D2D communication resource shared mode according to an embodiment of the present invention.

In the shared mode, as shown in FIG. 4, a D2D communication resource falls within a range originally allocated by the system to a cellular uplink transmission resource, for example, in an uplink carrier or an uplink subframe in an LTE system. The D2D communication resource and the cellular uplink transmission resource are separated in a time domain or in a frequency domain. In the shared mode, the resource configuration information includes frequency resource information and time resource information that are of cellular uplink resources and that are used for D2D communication. The frequency resource information includes a frequency and a bandwidth that are of the cellular uplink resources and that may be used for D2D communication, and the time resource information is a time segment that may be used for D2D communication.

Figure 5:
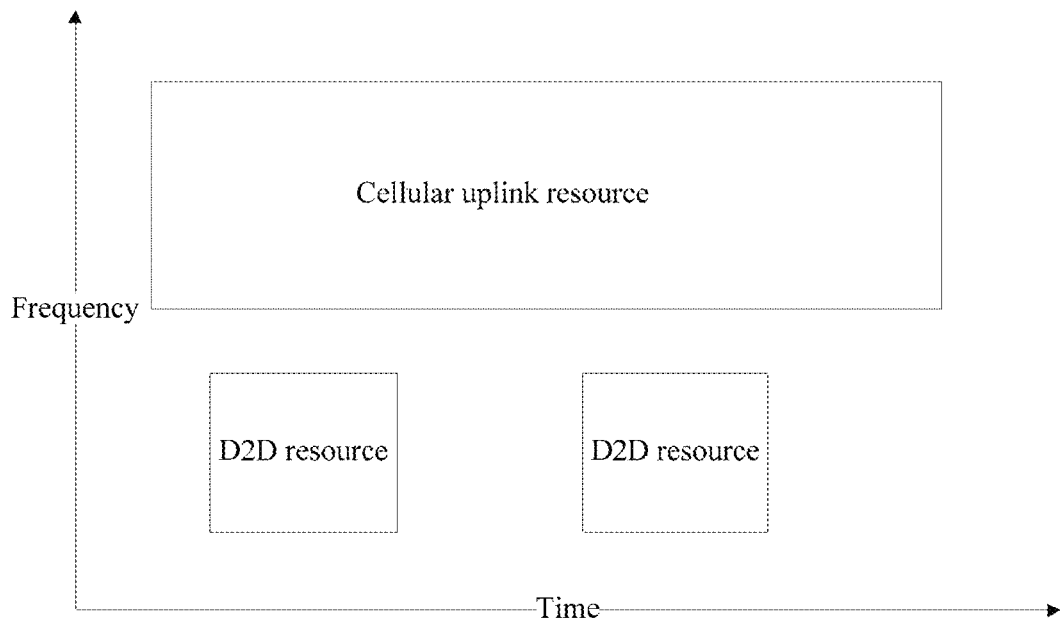
FIG. 5 is a schematic diagram of a D2D communication resource dedicated mode according to an embodiment of the present invention.

In the dedicated mode, as shown in FIG. 5, a D2D communication resource is located out of a range originally allocated by the system to a cellular uplink transmission resource (for example, an uplink carrier or an uplink subframe in an LTE system). That is, a dedicated resource for D2D communication is allocated in the system. In the dedicated mode, the resource configuration information includes carrier information and/or time information that are not included in the cellular uplink resources and that are used for D2D communication. The carrier information includes a frequency and a bandwidth that are not included in the cellular uplink resources and that may be used for D2D communication. In a time-division system, the time information may be a time segment in which a carrier in the system can be used for D2D communication. In the dedicated mode, because the D2D communication resource and the cellular uplink resource do not overlap, D2D communication and cellular uplink transmission do not interfere with each other.

For the step in which the network device configures resource configuration information for the user equipment for performing D2D communication, the network device may send the configuration information of the D2D communication resource to the user equipment when the user equipment is powered on and is attached to a network or when the user equipment changes a service area. Alternatively, the network device may regularly send the resource configuration information or send the resource configuration information according to a network occupation condition when necessary. A person skilled in the art may perform selection according to a specific application scenario, and details are not described herein.

If the step in which the network device configures resource configuration information for the user equipment for performing D2D communication is performed before step 304, in step 304, D2D communication resources selected by all users are included in D2D communication resources configured by the network device.

According to the setting in this embodiment, the user equipment may determine by itself, according to the resource selection parameter sent by the network device, whether the user equipment can occupy a D2D communication resource, and allocate a transmission resource to some types of D2D data, greatly improving D2D data transmission efficiency.

Embodiment 2

Embodiment 2 corresponds to Embodiment 1, and Embodiment 2 provides user equipment and a network device for performing the data transmission method in Embodiment 1.

Figure 6:
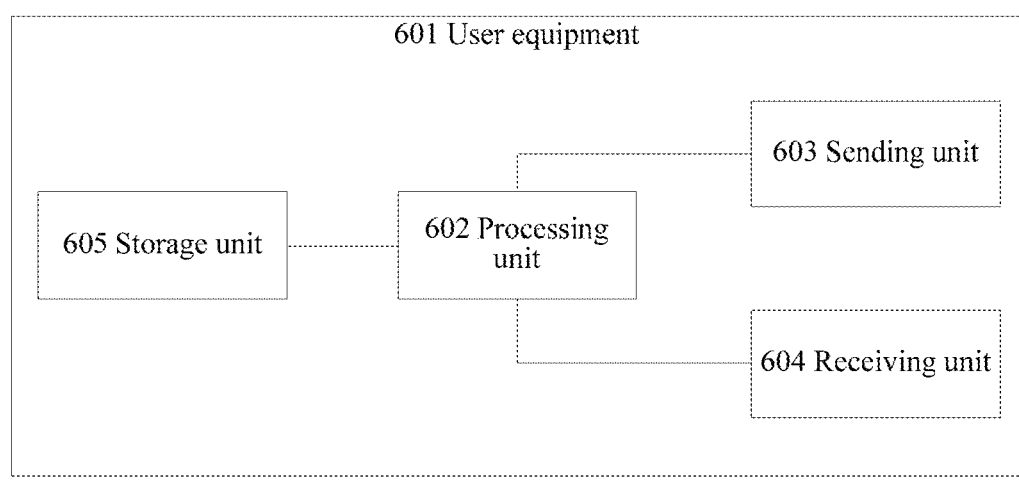
FIG. 6 is a schematic structural diagram of user equipment according to an embodiment of the present invention.
Figure 7:
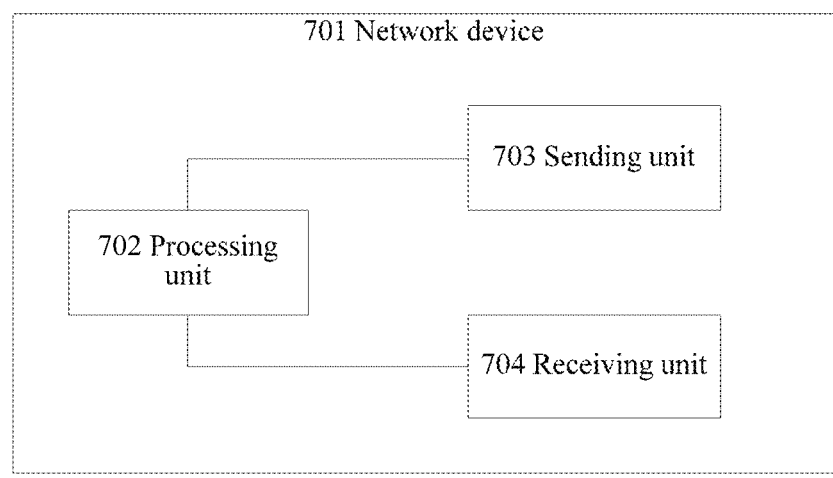
FIG. 7 is a schematic structural diagram of a network device according to an embodiment of the present invention.

The following describes the devices in Embodiment 2 of the present invention with reference to FIG. 6 and FIG. 7.

As shown in FIG. 6, user equipment 601 includes: a processing unit 602, a sending unit 603, a receiving unit 604, and a storage unit 605.

As shown in FIG. 7, a network device 701 includes: a processing unit 702, a sending unit 703, and a receiving unit 704.

A person skilled in the art should understand that the processing unit 602 and the processing unit 702 may be processors, the sending unit 603 and the sending unit 703 may be transmitters, the receiving unit 604 and the receiving unit 704 may be receivers, and the storage unit 605 may be a memory. The user equipment 601 and the network device 701 should further include other necessary components, such as power supply units, for implementing communication functions of the devices. These components are irrelevant to the present invention, and therefore are not described in detail herein.

Specifically, the network device 701 in FIG. 7 may be a base station or a core network device.

A quantity of D2D data types are pre-defined in the system in the present invention. The D2D data types include a service type and/or a priority type. For detailed description of the service type and the priority type, refer to relevant content of Embodiment 1, and details are not described herein again. For example, D2D data type information may include the service type, that is, a voice service, a data file service, a short message service, or the like, or may include the priority type, that is, a priority 1, a priority 2, . . . , and a priority N. N is an integer greater than 1.

The processing unit 602 of the user equipment 601 generates type information of the to-be-transmitted D2D data according to properties of to-be-transmitted data stored in the storage unit 605 of the user equipment 601.

The processing unit 602 transmits the generated type information of the to-be-transmitted D2D data to the sending unit 603. The sending unit 603 provides the network device 701 with the type information of the D2D data to be transmitted by the user equipment. The receiving unit 704 of the network device 701 receives the type information of the D2D data reported by the user equipment 601 and transmits the type information of the D2D data to the processing unit 702.

During actual application, the user equipment 601 may not report, to the network device 701, the type information of the D2D data to be transmitted by the user equipment, or the network device 701 has not received the type information reported by the user equipment 601 due to a transmission error. In this case, because all types of D2D data are already defined in the system, the network device may learn about all possible type information of D2D data to be transmitted by user equipment.

The processing unit 602 of the user equipment 601 is further adapted to determine a logical channel and a resource selection parameter used by different types of D2D data.

An allocation manner of the logical channel may be stored in configuration information. The configuration information includes a correspondence between the logical channel and type information of the D2D data. The configuration information may be stored in the user equipment 601, for example, in the storage unit 605, or may be generated by the processing unit 702 of the network device 701 and sent to the user equipment 601 by the sending unit 703 by using a system broadcast message and/or dedicated signaling. The receiving unit 604 of the user equipment 601 receives the configuration information and transmits the configuration information to the processing unit 602. A specific allocation manner of the logical channel is exactly the same as that in step 302 of Embodiment 1, and details are not described herein again.

The processing unit 602 of the user equipment 601 determines, according to the configuration information and the type of the D2D data to be transmitted by the user equipment, a logical channel of the D2D data to be transmitted by the user equipment.

When the user equipment 601 transmits the type information of the to-be-transmitted D2D data to the network device 701, the network device 701 may learn about types of D2D data of all user equipments that report type information of to-be-transmitted D2D data. In this way, the processing unit 702 of the network device 701 may generate configuration information according to the data types reported by the user equipments. The sending unit 703 sends the configuration information to the user equipments by using a system broadcast message and/or dedicated signaling. Logical channel groups are allocated to the D2D data of the types reported by the user equipments. In this case, the configuration information includes numbers of the configured logical channels. The receiving unit 604 of the user equipment receives the configuration information and transmits the configuration information to the processing unit 602. When the configuration information is sent by the network device to the user equipment, the network device may further determine the configuration information with reference to a type of the user equipment. For example, user equipments may be classified into advanced users, common users, and low-level users, and different logical channels are allocated to the different types of user equipments.

For the resource selection parameter, the processing unit 602 of the user equipment 601 may determine a resource selection parameter only for the to-be-transmitted D2D data, or determine resource selection parameters that correspond to all types of D2D data that are supported by the user equipment. A function and a specific generation manner of the resource selection parameter are exactly the same as those in step 303 of Embodiment 1. For example, a specific form is a resource backoff parameter. The resource backoff parameter includes a resource occupation probability and/or a backoff resource occupation time, or may include, if D2D communication resources can be used, a quantity of resources, in the D2D communication resources, that can be occupied each time. Details are not described herein.

The resource selection parameter may be pre-configured in the system and stored or fixed in the user equipment, for example, stored in the storage unit 605 of the user equipment 601. In this way, the processing unit 602 of the user equipment 601 may determine by itself, after determining the logical channel used by the D2D data, the resource selection parameter of this type of D2D data. Alternatively, the resource selection parameter may be generated by the processing unit 702 of the network device 701 and sent to the user equipment by the sending unit 703. The processing unit 702 may generate the resource selection parameter according to a system resource condition and a specific application environment, and send the resource selection parameter to the user equipment by using a system broadcast message and/or dedicated signaling. After receiving the resource selection parameter sent by the network device, the receiving unit 604 of the user equipment 601 sends the resource selection parameter to the processing unit 602, so that the processing unit 602 may determine a final resource selection parameter of different types of D2D data with reference to the resource selection parameter and a condition of the user equipment 601 itself. The processing unit 601 may generate at least one resource selection parameter. The at least one resource selection parameter includes a resource selection parameter configured for each type of D2D data in the D2D system. The processing unit 601 selects, according to the type of the to-be-transmitted D2D data, the resource selection parameter that corresponds to the D2D data from the at least one resource selection parameter. Alternatively, the processing unit 601 may generate a resource selection parameter for all types of D2D data in the D2D system. The resource selection parameter specifies a condition in which each type of D2D data can or cannot use a D2D communication resource.

In addition, when the user equipment 601 performs step 301, the network device 701 may learn about service types or priority types of D2D data of all user equipments performing step 301. In this way, the processing unit 702 of the network device 701 allocates, according to the service types or the priority types reported by the user equipments, resource selection parameters to the D2D data of the service types or the priority types reported by the user equipments. The sending unit 703 of the network device 701 may inform, by using a system broadcast message and/or dedicated signaling, the user equipments of the resource selection parameters used by the D2D data of the different service types or the different priority types. When the resource selection parameter is sent by the network device 701 to the user equipment 601, the processing unit 702 of the network device 701 may further determine the configuration information according to a type of the user equipment. For example, user equipments may be classified into advanced users, common users, low-level users, and the like, and different resource selection parameters are allocated to the different types of user equipments.

The processing unit 602 of the user equipment 601 determines by itself, according to the determined resource selection parameter and in consideration of the type of the D2D data to be transmitted by the user equipment, whether the user equipment can use a D2D communication resource or when the user equipment can use a D2D communication resource. When the user equipment can use a D2D communication resource, the processing unit 602 selects and uses a D2D communication resource, to perform D2D communication with another user equipment by using the logical channel determined by the processing unit 602.

Specifically, as described in Embodiment 1, when the resource selection parameter includes a resource occupation probability, before the processing unit 602 selects a D2D communication resource by itself, a random number R is generated for a resource block of each D2D communication resource, and a value of the random number R is a real number greater than 0 and less than 1. If the user equipment is to send D2D data with a priority 1 or a logical channel 1, the processing unit 602 determines values of a random number R and a backoff resource occupation probability value A that is corresponding to the data. If A is greater than R, the processing unit 602 may select, by itself, a D2D communication resource in the resource block to perform D2D communication. The sending unit 603 may send the to-be-transmitted D2D data with the priority 1 or the logical channel 1 to another user equipment by using the selected D2D communication resource. If A is not greater than R, the processing unit 602 does not select a D2D communication resource until a random number R' is generated for a next D2D communication resource block. If the user equipment is to send D2D data with another priority, a determining step is similar, and the user equipment respectively determines values of R and resource occupation probability values B and C. Details are not described herein.

As described in Embodiment 1, when the resource selection parameter includes a backoff resource occupation time, before selecting a D2D communication resource by itself, the processing unit 602 directly controls, according to the type of the D2D data to be transmitted by the user equipment, the sending unit 602 of the user equipment 601 to wait for a backoff resource occupation time that corresponds to this type of D2D data, and then the sending unit 603 occupies a D2D communication resource to perform D2D communication. If the user equipment is to send D2D data with a priority 1, the sending unit 603 of the user equipment waits for D milliseconds. A waiting step is similar for D2D data with an intermediate priority or a low priority, and details are not described herein.

The sending unit 703 of the network device 701 may configure, by using a system broadcast message and/or dedicated signaling, resource configuration information for performing D2D communication by the user equipment. The receiving unit of the user equipment 601 receives the resource configuration information and sends the resource configuration information to the processing unit 602. The resource configuration information may be configured in two manners: a shared mode and a dedicated mode. A specific description is exactly the same as that in Embodiment 1, and details are not described herein again.

If there is the step in which the network device 701 configures resource configuration information for performing D2D communication by the user equipment 601, after receiving the resource configuration information, the processing unit of the user equipment 601 controls D2D communication resources selected by all users to be included in D2D communication resources configured by the network device 701.

Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the shown or discussed mutual couplings or direct couplings or communication connections may be implemented by using some interfaces, indirect couplings or communication connections between the apparatuses or units, or electrical connections, mechanical connections, or connections in other forms.

What is claimed is:

1. A data transmission method, comprising:
   determining, by a terminal, a logical channel used by to-be-transmitted device-to-device (D2D) data;
   determining, by the terminal, a resource selection parameter of the to-be-transmitted D2D data, wherein the resource selection parameter specifies a probability that a resource block in D2D communication resource can be occupied when the to-be-transmitted D2D data is sent;
   selecting, by the terminal according to the resource selection parameter, a D2D communication resource from a configured D2D communication resource; and
   sending, on the selected D2D communication resource, the to-be-transmitted D2D data to another terminal by using the determined logical channel.

2. The method according to claim 1, wherein
   the resource selection parameter further specifies a quantity of resources that can be occupied each time the to-be-transmitted D2D data uses a D2D communication resource.

3. The method according to claim 1, wherein
   before the determining, by the terminal, a resource selection parameter of the to-be-transmitted D2D data, the method further comprises:
   receiving, by the terminal, the resource selection parameter from a network device.

4. The method according to any one of claim 1, wherein
   before the determining, by the terminal, a resource selection parameter of the to-be-transmitted D2D data, the method further comprises:
   sending, by the terminal, type information of the to-be-transmitted D2D data to a network device.

5. A data transmission method, wherein the method comprises:
   configuring, by a network device according to a type of to-be-transmitted a device-to-device (D2D) by a terminal, a resource selection parameter that corresponds to D2D data, wherein the resource selection parameter specifies a probability that a resource block in D2D communication resource can be occupied when to-be-transmitted D2D data is sent; and
   sending, by the network device, the configured resource selection parameter to the terminal.

6. The method according to claim 5, wherein
   before the sending, by the network device, the resource selection parameter to the terminal, the method comprises:
   receiving, by the network device, type information of the D2D data to be transmitted by the terminal from the terminal.

7. The method according to claim 5, wherein
the resource selection parameter further specifies a quantity of resources that can be occupied each time the to-be-transmitted D2D data uses a D2D communication resource.

8. A data transmission apparatus, comprising:
a storage medium including executable instructions; and
a processor;
wherein the executable instructions, when executed by the processor, cause the apparatus to:
determine a logical channel used by to-be-transmitted device-to-device (D2D) data and a resource selection parameter of the to-be-transmitted D2D data, wherein the resource selection parameter specifies a probability that a resource block in D2D communication resource can be occupied when the to-be-transmitted D2D data is sent;
select, according to the resource selection parameter, a D2D communication resource from a configured D2D communication resource; and
send, on the D2D communication resource, the to-be-transmitted D2D data to another terminal by using the determined logical channel.

9. The data transmission apparatus according to claim 8, wherein
the resource selection parameter further specifies a quantity of resources that can be occupied each time the to-be-transmitted D2D data uses a D2D communication resource.

10. The data transmission apparatus according to claim 8, wherein
the executable instructions, when executed by the processor, further cause the apparatus to:
before determining the resource selection parameter of the to-be-transmitted D2D data, receiving the resource selection parameter from a network device.

11. The data transmission apparatus according to claim 8, wherein
the executable instructions, when executed by the processor, further cause the apparatus to:
before determining the resource selection parameter of the to-be-transmitted D2D data, send type information of the to-be-transmitted D2D data to a network device.

12. A data transmission apparatus, comprising:
a storage medium including executable instructions; and
a processor;
wherein the executable instructions, when executed by the processor, cause the apparatus to:
configure, according to a type of to-be-transmitted device-to-device (D2D) data by a terminal, a resource selection parameter that corresponds to the D2D data, wherein the resource selection parameter specifies a probability that a resource block in D2D communication resource can be occupied when the to-be-transmitted D2D data is sent; and
send the resource selection parameter to the terminal.

13. The apparatus according to claim 12, wherein
the executable instructions, when executed by the processor, further cause the apparatus to:
before sending the resource selection parameter to the terminal, receive type information that is of the D2D data to be transmitted by the terminal and that is sent by the terminal.

14. The apparatus according to claim 12, wherein
the resource selection parameter further specifies a quantity of resources that can be occupied each time the to-be-transmitted D2D data uses a D2D communication resource.

\* \* \* \* \*